United States Patent
Leanza (10) Patent No.: US 8,262,155 B2
(45) Date of Patent: Sep. 11, 2012

(54) OVERMOLDED JOINT FOR BEAM ASSEMBLY

(75) Inventor: Anthony Leanza, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 12/748,599

(22) Filed: Mar. 29, 2010

(65) Prior Publication Data
US 2011/0133517 A1  Jun. 9, 2011

Related U.S. Application Data

(60) Provisional application No. 61/267,063, filed on Dec. 6, 2009.

(51) Int. Cl.
*E04H 12/00* (2006.01)
(52) U.S. Cl. .......... 296/205; 296/29; 296/187.01; 52/653.1; 52/844; 403/265
(58) Field of Classification Search .......... 52/650.1, 52/653.1, 653.2, 655.1, 843, 844, 846; 296/203.1, 296/205, 29, 187.01; 403/265, 269
See application file for complete search history.

(56) References Cited

U.S. PATENT DOCUMENTS

| | | | | |
|---|---|---|---|---|
| 4,552,400 A * | 11/1985 | Harasaki et al. | ......... | 296/203.03 |
| 5,226,696 A * | 7/1993 | Klages et al. | ............ | 296/203.01 |
| 5,269,585 A * | 12/1993 | Klages et al. | ................. | 296/205 |
| 5,318,338 A * | 6/1994 | Ikeda | ............................ | 296/210 |
| 5,332,281 A * | 7/1994 | Janotik et al. | ................. | 296/209 |
| 5,382,071 A * | 1/1995 | Enning et al. | ............ | 296/203.03 |
| 5,549,352 A * | 8/1996 | Janotik et al. | ................. | 296/209 |
| 5,603,581 A * | 2/1997 | Fujita et al. | .................... | 403/272 |
| 5,658,041 A * | 8/1997 | Girardot et al. | .......... | 296/193.09 |
| 6,092,865 A * | 7/2000 | Jaekel et al. | .................. | 296/205 |
| 6,241,310 B1 * | 6/2001 | Patelczyk | ..................... | 296/205 |
| 6,273,496 B1 * | 8/2001 | Guyomard et al. | ...... | 296/193.09 |

(Continued)

FOREIGN PATENT DOCUMENTS

CA  2394790  5/2001

(Continued)

OTHER PUBLICATIONS

Grujicic, Sellappan M. et al., "Selection of the Spraying Technologies for Over-Coating of Metal-Stampings With Thermo-Plastics for Use in Direct-Adhesion Polymer Metal Hybrid Load-Bearing Components," *J. Mater. Process. Tech.* (2007), doi:10.1016/j.jmatpr_otec.2007.07.011 Journal of Materials Processing Technology Jul. 11, 2007.

*Primary Examiner* — William Gilbert
*Assistant Examiner* — James Ference
(74) *Attorney, Agent, or Firm* — Clifford B Vaterlaus (57) ABSTRACT

A subassembly of a vehicle assembly is provided. The subassembly of the vehicle assembly includes at least one beam, at least one beam support having a plurality of holes, wherein the at least one beam and the at least one beam support are connected and reinforced by an overmolded joint. The overmolded joint includes a top portion, a bottom portion, and at least one load bearing wall. An end of the at least one beam support contacts the at least one beam, and the at least one load bearing wall abuts the at least one beam.

18 Claims, 8 Drawing Sheets

U.S. PATENT DOCUMENTS

| | | | | |
|---|---|---|---|---|
| 6,332,731 | B1 * | 12/2001 | Wycech | 403/171 |
| 6,361,244 | B1 * | 3/2002 | Ni et al. | 403/393 |
| 6,412,855 | B1 * | 7/2002 | Cantineau et al. | 296/187.01 |
| 6,416,117 | B1 * | 7/2002 | Weiman | 296/204 |
| 6,499,798 | B2 * | 12/2002 | Takemoto | 296/203.02 |
| 6,539,604 | B2 * | 4/2003 | Patelczyk | 29/421.1 |
| 6,547,317 | B1 * | 4/2003 | Cheron et al. | 296/193.01 |
| 6,578,909 | B1 * | 6/2003 | Reed et al. | 296/210 |
| 6,604,781 | B2 * | 8/2003 | Uchida | 296/204 |
| 6,709,022 | B1 * | 3/2004 | Daumas et al. | 285/197 |
| 6,713,707 | B2 * | 3/2004 | Gabbianelli et al. | 219/94 |
| 6,893,590 | B1 * | 5/2005 | Rigosi et al. | 264/135 |
| 6,938,950 | B2 * | 9/2005 | Nagafuchi et al. | 296/203.02 |
| 6,957,845 | B2 * | 10/2005 | Rager | 296/146.9 |
| 7,001,097 | B2 * | 2/2006 | Wang et al. | 403/231 |
| 7,066,533 | B2 * | 6/2006 | Sohmshetty et al. | 296/203.02 |
| 7,090,273 | B2 * | 8/2006 | Stojkovic et al. | 296/29 |
| 7,182,545 | B2 * | 2/2007 | Riviere et al. | 403/267 |
| 7,306,279 | B2 * | 12/2007 | Saitoh | 296/146.8 |
| 7,322,106 | B2 * | 1/2008 | Marando et al. | 29/897.2 |
| 7,357,460 | B2 * | 4/2008 | Schlanger | 301/104 |
| 7,367,613 | B2 * | 5/2008 | Ellison et al. | 296/193.02 |
| 7,389,586 | B2 * | 6/2008 | Patberg | 29/897.2 |
| 7,479,246 | B2 * | 1/2009 | Muteau et al. | 264/273 |
| 7,500,802 | B2 * | 3/2009 | Patberg | 403/207 |
| 7,547,063 | B2 * | 6/2009 | Stojkovic et al. | 296/203.03 |
| 7,871,123 | B2 * | 1/2011 | Stojkovic et al. | 296/193.09 |
| 2001/0042986 | A1 * | 11/2001 | Patelczyk | 296/29 |
| 2001/0050497 | A1 * | 12/2001 | Jaekel et al. | 296/205 |
| 2001/0053431 | A1 * | 12/2001 | Goldbach et al. | 428/139 |
| 2002/0043814 | A1 * | 4/2002 | Weiman | 296/29 |
| 2003/0070387 | A1 | 4/2003 | Klocke et al. | 52/638 |
| 2003/0077409 | A1 * | 4/2003 | Schnell | 428/35.8 |
| 2004/0072006 | A1 | 4/2004 | Staargaard et al. | 428/544 |
| 2004/0105949 | A1 * | 6/2004 | Krause | 428/57 |
| 2005/0046215 | A1 * | 3/2005 | Chung | 296/29 |
| 2006/0061137 | A1 * | 3/2006 | Stojkovic et al. | 296/198 |
| 2006/0181089 | A1 * | 8/2006 | Andre et al. | 293/120 |
| 2007/0210616 | A1 * | 9/2007 | Wenzel et al. | 296/187.03 |
| 2008/0012176 | A1 * | 1/2008 | MacDonald et al. | 264/279 |
| 2008/0143143 | A1 * | 6/2008 | Brennecke | 296/187.01 |
| 2009/0081407 | A1 * | 3/2009 | Giraud | 428/98 |
| 2010/0074678 | A1 * | 3/2010 | Jaranson et al. | 403/267 |

FOREIGN PATENT DOCUMENTS

| | | |
|---|---|---|
| EP | 1112830 | 4/2001 |
| EP | 1433663 | 6/2004 |
| WO | WO-2009076753 | 6/2009 |

* cited by examiner

OVERMOLDED JOINT FOR BEAM ASSEMBLY

CROSS-REFERENCE TO RELATED APPLICATIONS

This U.S. non-provisional application claims priority from U.S. provisional patent application No. 61/267,063, entitled OVERMOLDED JOINT FOR BEAM ASSEMBLY, filed Dec. 6, 2009, the disclosure of which is incorporated by reference herein in its entirety.

FIELD OF INVENTION

The present application is directed to a beam connection in a vehicle assembly. More particularly, the present application is directed to an overmolded joint for a beam connection in a vehicle assembly.

BACKGROUND

In a vehicle assembly, metal frames include welded, riveted, or bolted components. For example, the joint between an instrument panel structural frame main beam and a vertical attachment that connects to the automobile's floor is generally a portion of an all metal frame with several welded or bolted components.

SUMMARY

A subassembly of a vehicle assembly is provided. The subassembly of the vehicle assembly includes at least one beam, at least one beam support having a plurality of holes, wherein the at least one beam and the at least one beam support are connected and reinforced by an overmolded joint.

The overmolded joint includes a top portion, a bottom portion, and at least one load bearing wall. An end of the at least one beam support contacts the at least one beam, and the at least one load bearing wall abuts the at least one beam.

BRIEF DESCRIPTION OF THE DRAWINGS

In the accompanying drawings, structural embodiments are illustrated that, together with the detailed description provided below, describe exemplary embodiments of a beam assembly. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The principles disclosed in this application are applicable to various joint designs in various types of vehicles. For example, the principles discussed below can be applied to automobiles, trucks, recreational vehicles, and the like.

Figure 1:
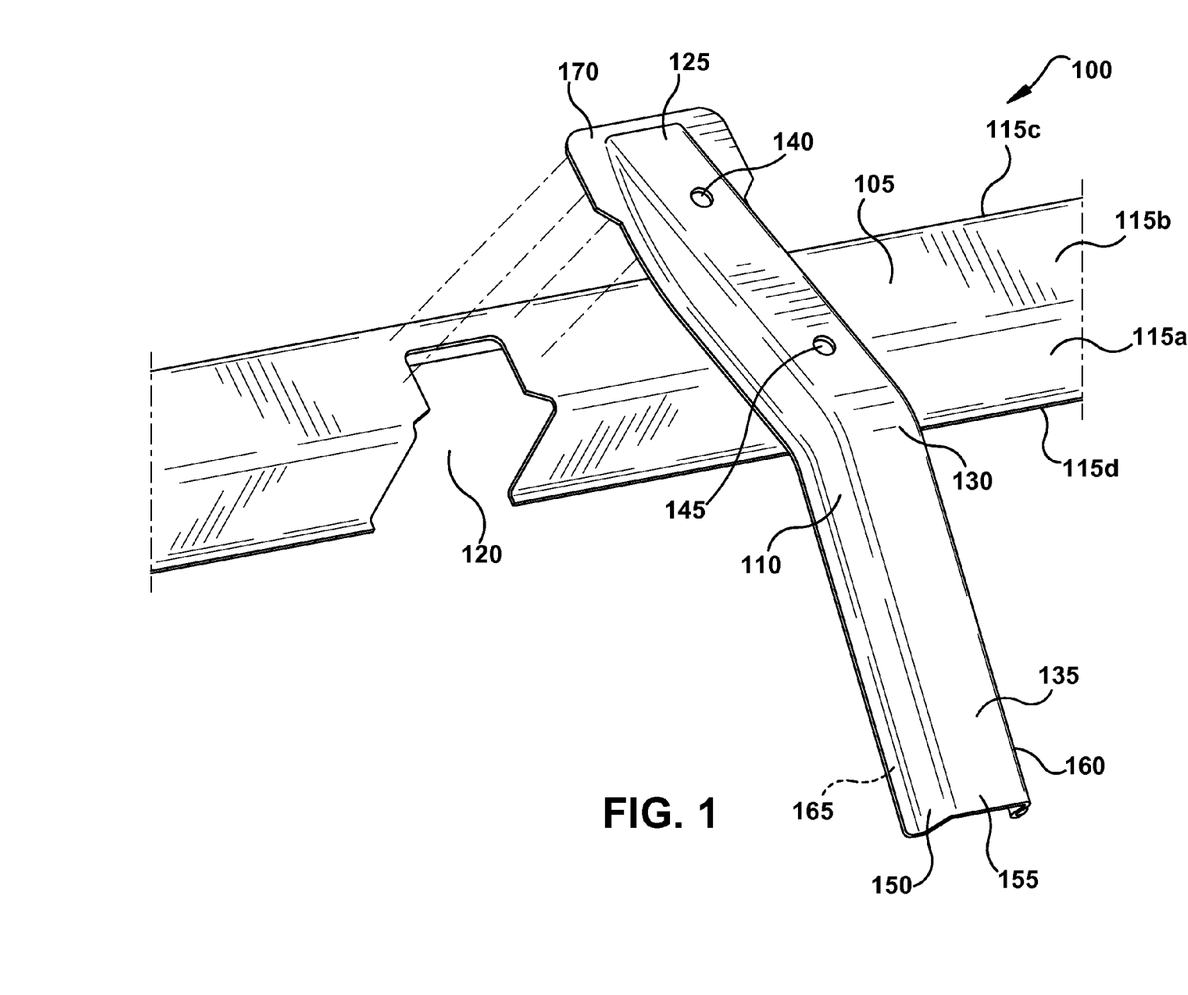
FIG. 1 illustrates a partial exploded view of one embodiment of a beam assembly including a main beam and a main beam support.

FIG. 1 illustrates a partial exploded view of one embodiment of a beam assembly 100 including a main beam 105 and a main beam support 110. Main beam 105 and main beam support 110 are constructed of aluminum, steel, or other materials that can be stamped or formed into shape. Main beam 105 includes a front side 115a, a top side 115b, a rear side 115c, and a bottom side 115d forming a U-shaped cross section. In an alternative embodiment (not shown), main beam 105 may include less than three sides or more than three sides. In an alternative embodiment (not shown), main beam 105 and main beam support 110 can be replaced with one or more beams. In another alternative embodiment (not shown), main beam 105 and main beam support 110 can be replaced with one or more members. In yet another alternative embodiment (not shown), main beam 105 and main beam support 110 can be a beam and a beam support, respectively.

Prior to assembly, a portion of the main beam 105 is removed from front side 115a and top side 115b, thereby forming a cutout 120. In an alternative embodiment (not shown), cutout 120 may be formed in a single side of main beam 105 or more than two sides of main beam 105. In still another alternative embodiment (not shown), main beam 105 may include more than one cutout 120. In yet another alternative embodiment, the main beam 105 lacks a cutout.

With continued reference to FIG. 1, main beam support 110 includes a first end 125, a middle portion 130, and a second end 135, wherein middle portion 130 includes a first hole 140 and a second hole 145. The main beam support 110 has a cross section consisting of a first side surface 150, a top surface 155, a second side surface 160, and a bottom structure 165. In an alternative embodiment, main beam support 110 may include less than three surfaces or more than three surfaces. In other words, main beam support 110 may have any geometric cross section.

In another embodiment (not shown), main beam 105 and main beam support 110 further include a plurality of holes, enabling mechanical connection of main beam support 110 to main beam 105. In yet another embodiment (not shown), planar surface 170 includes holes and can be aligned with holes in the main beam 105, to receive fasteners such that main beam support 110 may be attached to the main beam 105. Exemplary fasteners include bolts, rivets, and the like. Alternatively, the holes of the main beam support 110 and main beam 105 may be in the form of slots having a width and a length. In such an embodiment, main beam 105 and main beam support 110 may be further attached at a plurality of locations by welding, riveting, and the like.

Figure 2:
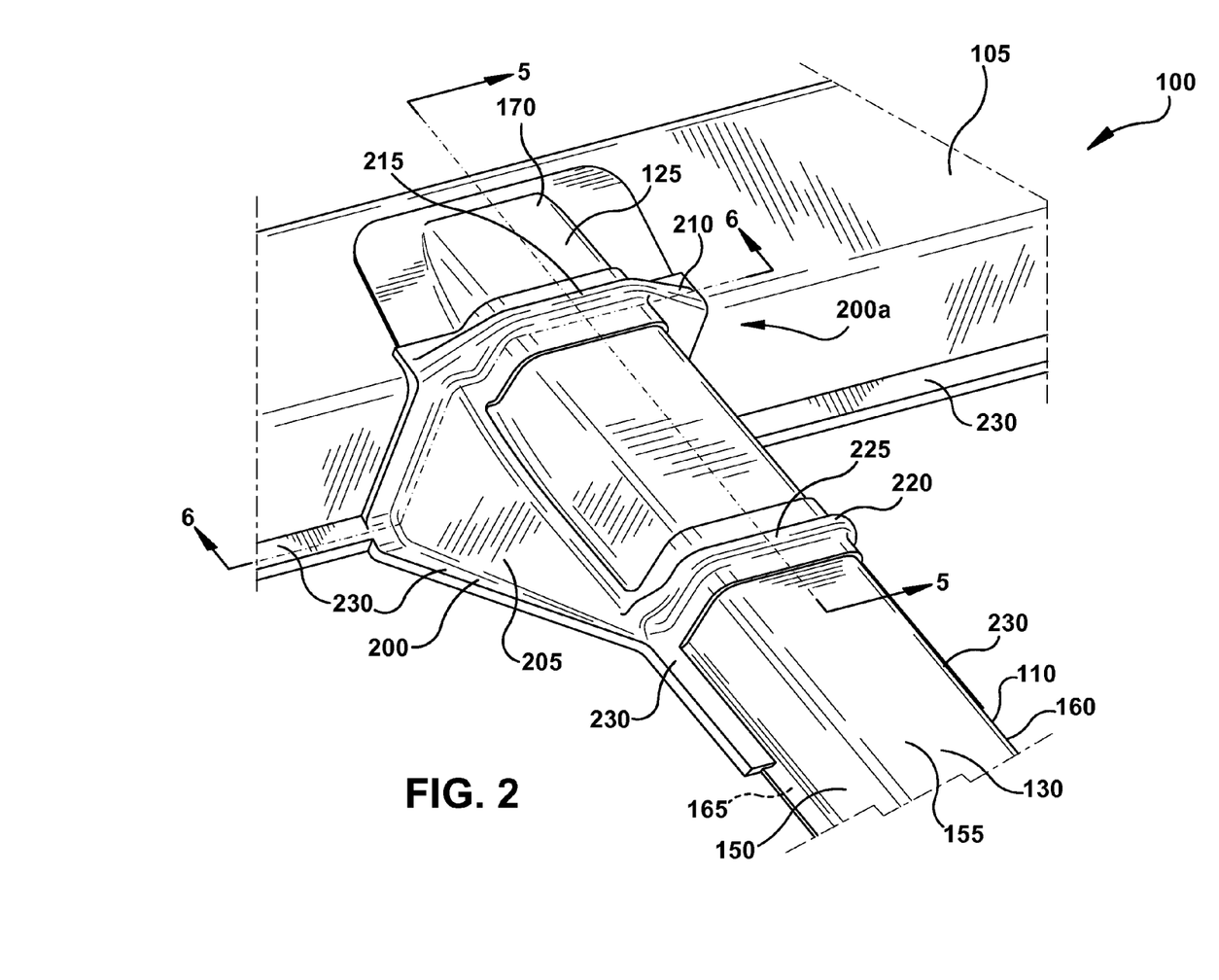
FIG. 2 is a partial perspective view of the beam assembly including an overmolded joint assembly on the main beam and main beam support.

FIG. 2 illustrates a subassembly of main beam 105 and main beam support 110 reinforced by an overmolded joint 200. The overmolded joint 200 may be formed by placing main beam 105 and main beam support 110 into an injection mold, closing the mold, injecting mold material into the closed mold to form overmolded joint 200, opening the mold, and removing the subassembly from the mold. In one embodiment (not shown), main beam 105 and main beam support 110 are attached before being placed into the injection mold. In an alternative embodiment (not shown), main beam 105 and main beam support 110 are further attached after they are removed from the injection mold.

During the injection step, mold material enters the space formed by cutout 120 to create a load bearing wall (not shown) on bottom structure 165 of main beam support 110 and bottom side 115d of main beam 105, extending at least between first side surface 150 and second side surface 160, away from top surface 155 of main beam support 110 and away from top side 115b of main beam 105. The mold material can be glass filled polypropylene or may be constructed of a variety of polymeric materials, including, without limitation, polypropylene, polyethylene, ethylene propylene diene monomer (EPDM) rubber, a combination thereof, or any other suitable molding material known to those skilled in the art.

With continued reference to FIG. 2, overmolded joint 200 includes a top portion 200a having two substantially triangular gussets, including a first gusset 205 extending from first side surface 150 of main beam support 110 to main beam 105 and a second gusset (not shown in this view) extending from second side surface 160 of main beam support 110 to main beam 105. Overmolded joint 200 further includes a plurality of reinforcement ribs, including a first reinforcement rib 210 extending along the perimeter of the main beam support 110 and extending through first hole 140 of main beam support 110 at a first position 215. In addition, overmolded joint 200 includes a second reinforcement rib 220 extending along the perimeter of the main beam support 110 and extending through second hole 145 of main beam support 110 at a second position 225. The overmolded joint 200 also has load bearing wall (not shown) on the bottom side of the main beam support 110 along the perimeter of bottom structure 165 that extends away from top surface 155. Overmolded joint 200 further includes at least one supporting rib 230 at multiple perimeter locations, supporting ribs 230 extend along first side surface 150 and second side surface 160 of main beam support 110 and edges of main beam 105.

Figure 3:
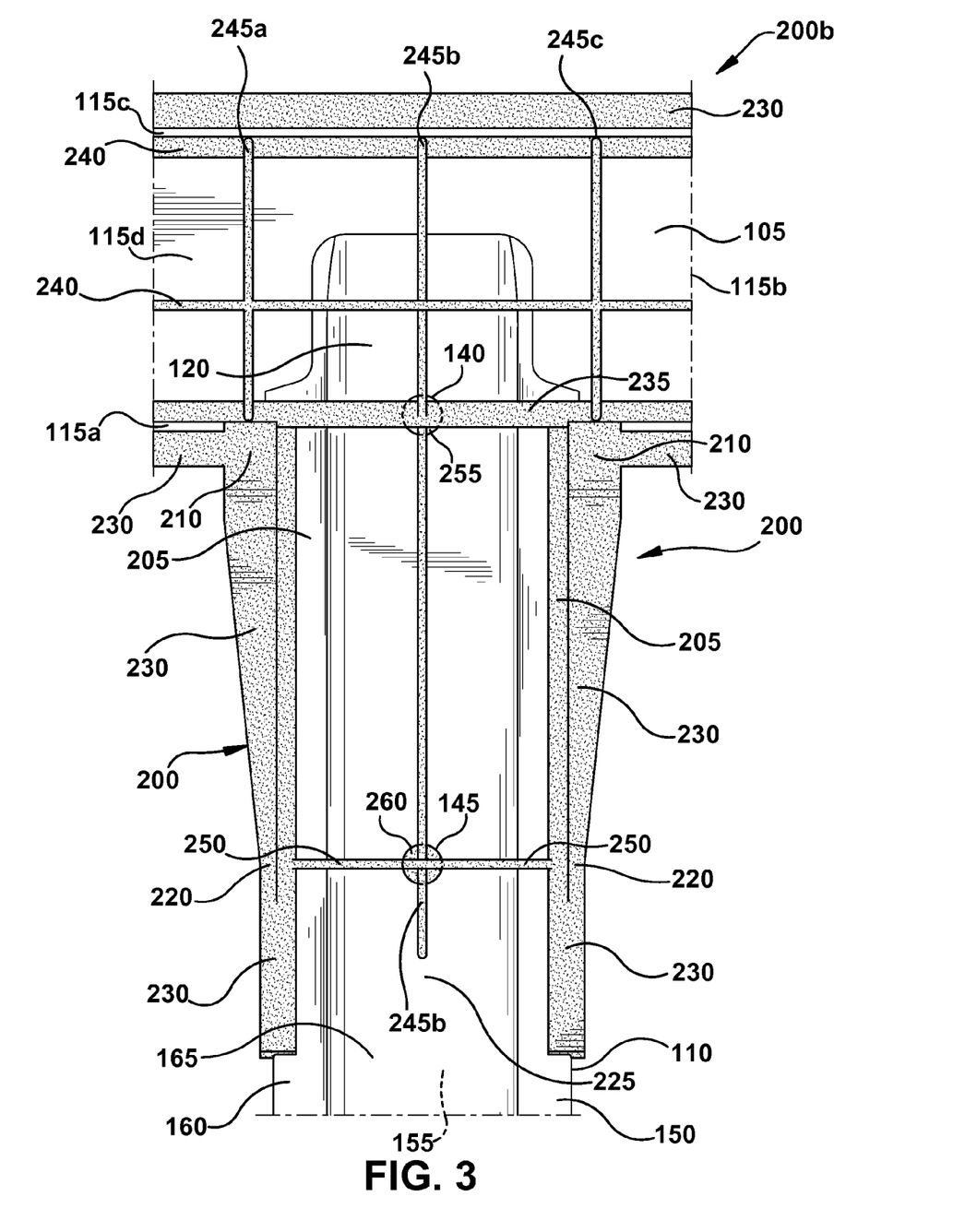
FIG. 3 is a bottom view of the overmolded joint assembly illustrated in FIG. 2.

FIG. 3 is a bottom view illustrating a bottom portion 200b of the subassembly reinforced by overmolded joint 200 illustrated in FIG. 2. Overmolded joint 200 further includes a load bearing wall 235, two lateral ribs 240, and three spanning ribs 245a-c. Load bearing wall 235 extends between first side surface 150 and second side surface 160 and into the opening formed by cutout 120 in front side 115a. Supporting ribs 230 are included on edges of front side 115a and rear side 115c. Load bearing wall 235 in combination with lateral ribs 240 and spanning ribs 245a-c form a lattice within main beam 105 to increase the rigidity and strength of main beam 105 in cutout 120 and to increase the strength of overmolded joint 200. Further, overmolded joint 200 includes at least one rib 250 and an extension of at least one spanning rib 245b in bottom structure 165 of main beam support 110. Although rib 245b is shown as a single, elongated rib, it may be replaced by a series of shorter ribs. It should also be understood, that the illustrated lattice is merely exemplary. Any number of ribs, in various orientations, may be employed to strengthen the subassembly.

In the illustrated embodiment, first reinforcement rib 210 connects to load bearing wall 235 by extending through first hole 140 of main beam support 110, forming a first connecting rib 255. Second reinforcement rib 220 extends through second hole 145 of main beam support 110, forming a second connecting rib 260 that connects at least one rib 250 and second reinforcement rib 220. At least one supporting rib 230 on each side of the overmolded joint 200 tapers from first reinforcement rib 210 to second reinforcement rib 220. As illustrated in FIG. 3, the load bearing wall 235, two gussets 205, at least one rib 250, first reinforcement rib 210 extending through first hole 140 of main beam support 110 and forming first connecting rib 255, and second reinforcement rib 220 extending through second hole 145 of main beam support 110 and forming second connecting rib 260 combine to reinforce overmolded joint 200.

Figure 4:
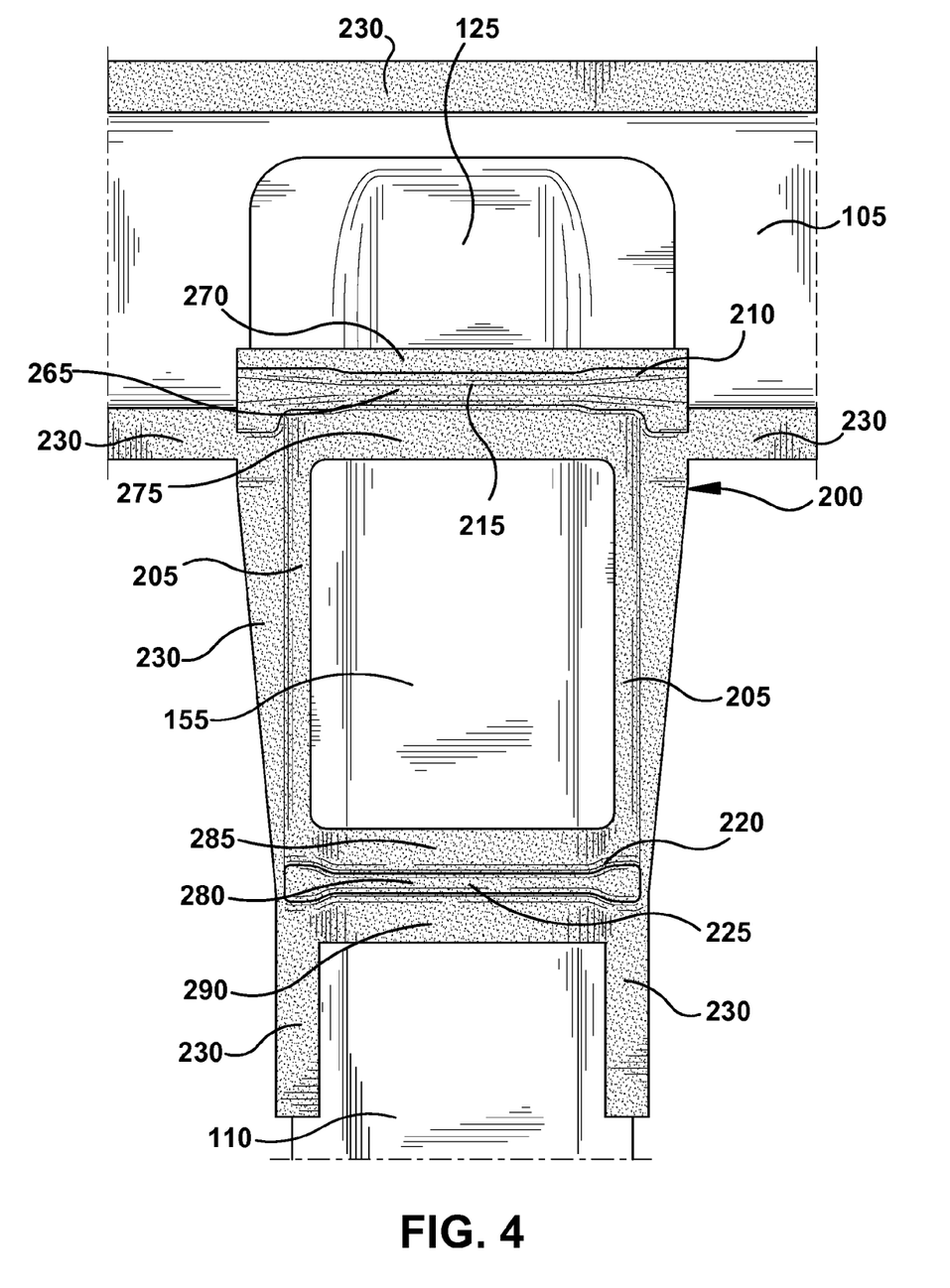
FIG. 4 is a top view of the overmolded joint assembly illustrated in FIG. 2.

FIG. 4 is a top view of the subassembly of main beam 105 and main beam support 110 reinforced by overmolded joint 200. First reinforcement rib 210 includes main rib portion 265 and first and second portions 270, 275 and connects the two triangular gussets 205 at first position 215. Second reinforcement rib 220 includes main rib portion 280 and first and second portions 285, 290 and connects the two triangular gussets 205 at second position 225. In an alternative embodiment (not shown), overmolded joint 200 may include more or less than two reinforcement ribs. In yet another alternative embodiment (not shown), reinforcement ribs in overmolded joint 200 may have ribs or gussets of a different shape or design. In another alternative embodiment (not shown), at least top surface 155 of main beam support 110 between first reinforcement rib 210 and second reinforcement rib 220 is overmolded.

Figure 5:
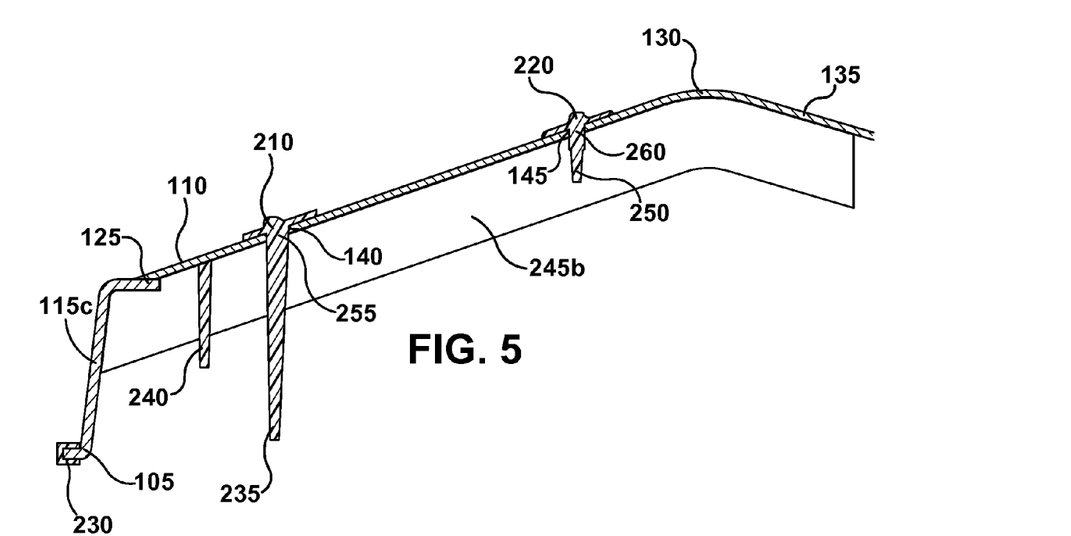
FIG. 5 is a cross-sectional view along line 5-5 shown in FIG. 2.

FIG. 5 is a cross-sectional view along line 5-5 shown in FIG. 2. Cross-section 5-5 illustrates main beam 105 connected to main beam support 110, reinforced by overmolded joint 200. Sections of main beam support 110 are illustrated, including first end 125, middle portion 130, and second end 135. Load bearing wall 235, lateral rib 240, and rib 250 are located between first end 125 and middle portion 130. Load bearing wall 235 is vertically below first reinforcement rib 210 and connects to it by extending through first hole 140 in the form of first connecting rib 255. A rib 250 is located vertically below second reinforcement rib 220 and connects to it by extending through second hole 145 in the form of second connecting rib 260. Rear side 115c includes supporting rib 230. Spanning rib 245b extends on the bottom of main beam 105 and main beam support 110, from rear side 115c of main beam 105 to second end 135 of main beam support 110. In another embodiment (not shown), spanning rib 245b extends on the bottom of main beam 105 and on at least a portion of main beam support 110.

Figure 6:
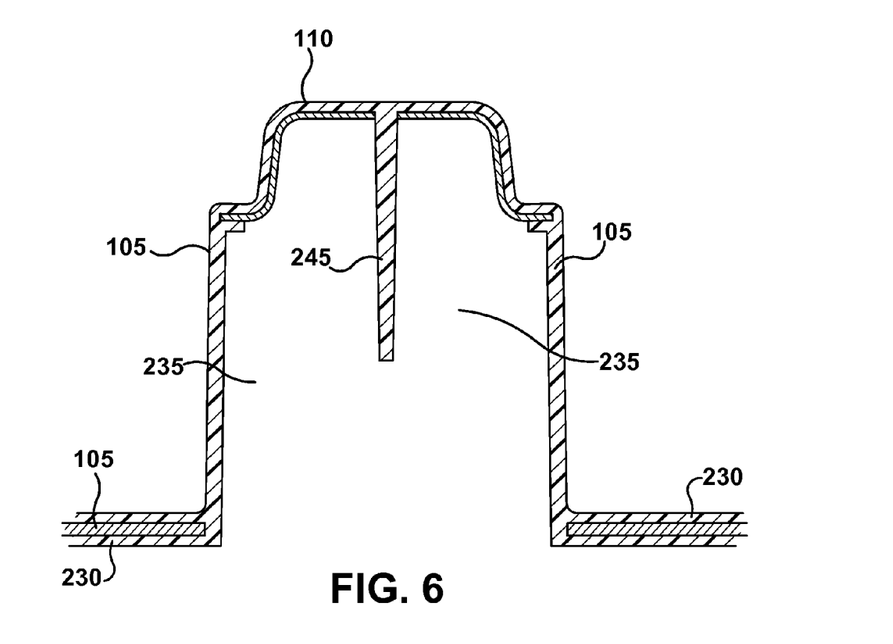
FIG. 6 is a cross-sectional view along line 6-6 shown in FIG. 2.

FIG. 6 is a cross-sectional view along line 6-6 shown in FIG. 2. Cross-section 6-6 illustrates main beam 105 connected to main beam support 110, reinforced by load bearing wall 235 and at least one spanning rib 245. As discussed above, load bearing wall 235 entirely spans cutout 120 along front side 115a in main beam 105.

Figure 7:
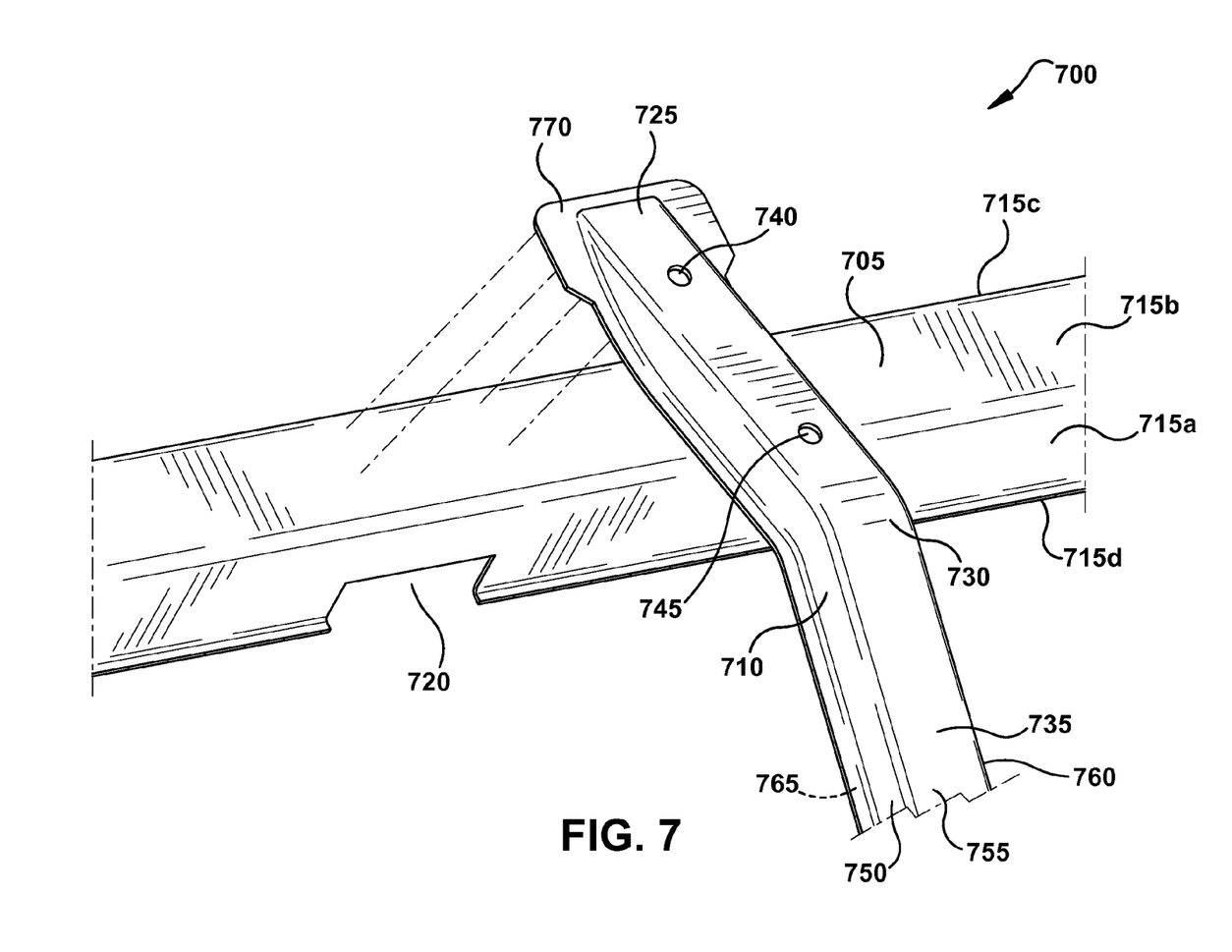
FIG. 7 is a partial exploded view of another embodiment of a beam assembly including a main beam and a main beam support.

FIG. 7 is a partial exploded view of another embodiment of a beam assembly 700 including a main beam 705 and a main beam support 710. Main beam 705 includes a front side 715a, a top side 715b, a rear side 715c, and a bottom side 715d. Main beam support 710 includes a first end 725, a middle portion 730, and a second end 735, a first hole 740, a second hole 745, a first side surface 750, a top surface 755, a second side surface 760, and a bottom structure 765. Beam assembly 700 is substantially identical to beam assembly 100 in FIG. 1, except main beam 105 includes a cutout 720 only in a portion of the front side 715a, thereby forming a partial cutout 720.

Figure 8:
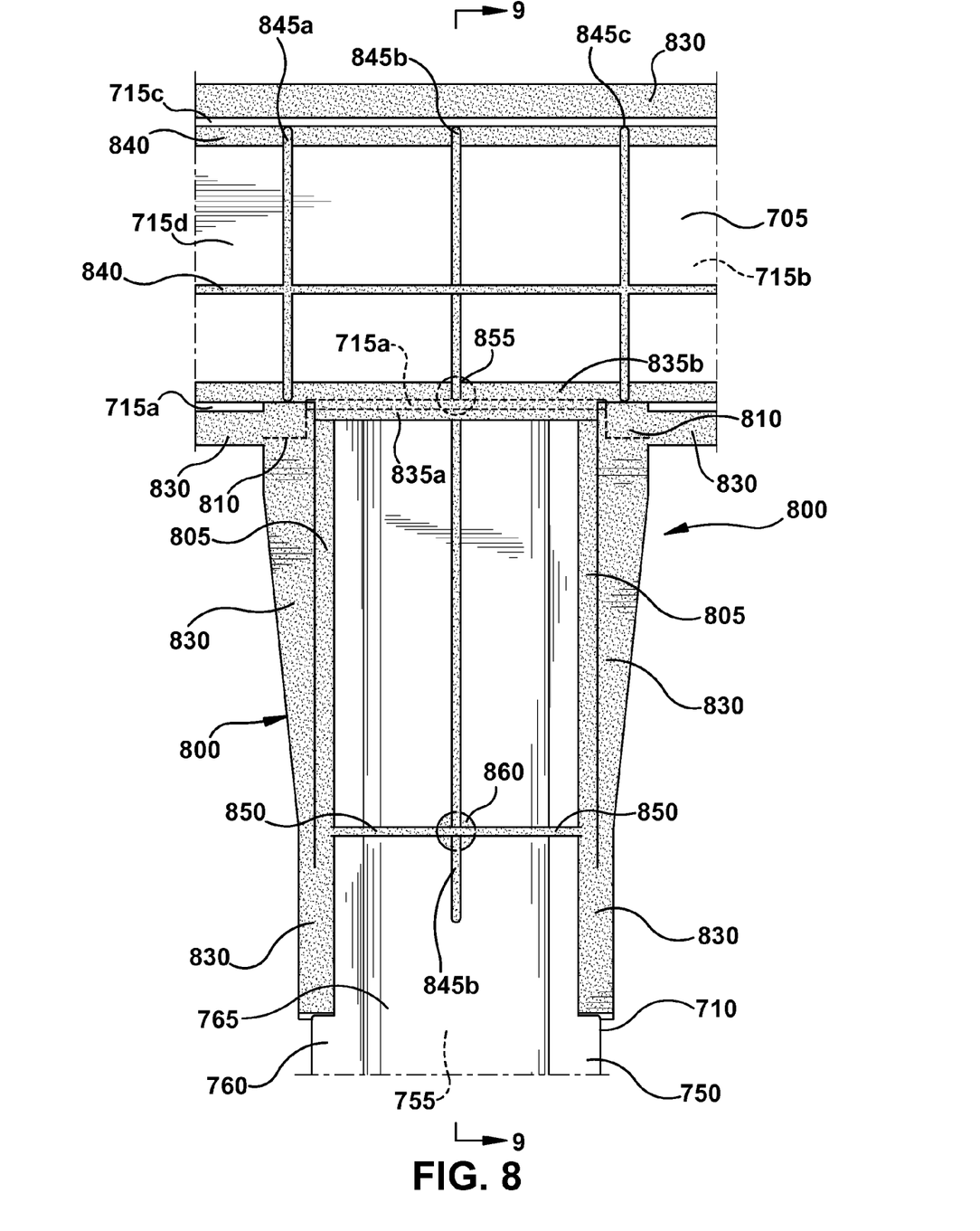
FIG. 8 is a bottom view of an overmolded joint assembly and the beam assembly illustrated in FIG. 7.

FIG. 8 is a bottom view of an alternative overmolded joint assembly 800 reinforcing beam assembly 700 illustrated in FIG. 7. Overmolded joint assembly 800 is substantially identical to overmolded joint assembly 200 in FIGS. 2 and 3, except overmolded joint assembly 800 includes at least two load bearing walls. In the illustrated embodiment, the at least two load bearing walls include a first load bearing wall 835*a* and a second load bearing wall 835*b*, each filling at least a portion of cutout 720 and abutting opposing surfaces of front side 715*a*. In the illustrated embodiment, first load bearing wall 835*a* abuts front side 715*a*, located adjacent to gussets 805. Further, second load bearing wall 835*b* abuts front side 715*a*, located adjacent to lateral rib 840. First load bearing wall 835*a* and second load bearing wall 835*b* are connected at one end, enclosing front side 715*a* of main beam 705. As illustrated in FIG. 7, beam assembly 700 does not include a cutout 120 in top side 715*b* of main beam 705. In another embodiment (not shown), overmolded joint assembly 800 includes at least two load bearing walls and main beam 705 does not include cutout 120. In another embodiment (not shown), first load bearing wall 835*a* and second load bearing wall 835*b* are not connected at one end, so front side 715*a* of main beam 705 is not enclosed.

Figure 9:
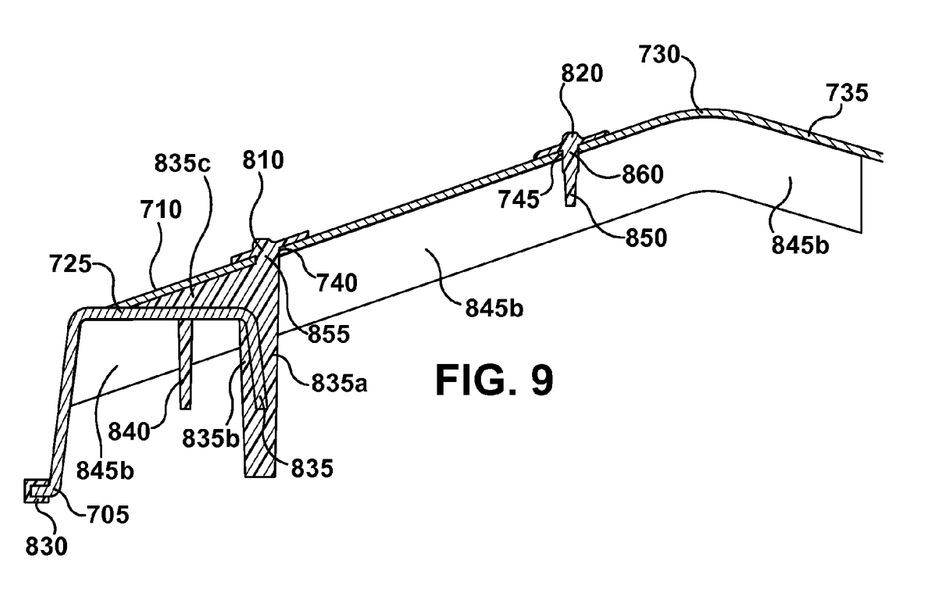
FIG. 9 is a cross-sectional view along line 9-9 shown in FIG. 8.

FIG. 9 is a cross-sectional view along line 9-9 shown in FIG. 8. Cross-sectional view along line 9-9 is substantially identical to the cross-sectional view 5-5 in FIG. 5, except main beam 705 does not include cutout 720 in top side 715*b*. Further, first side 715*a* is reinforced by first load bearing wall 835*a* and second load bearing wall 835*b* on opposing sides of front side 715*a* and main beam support 710 is supported by a triangular portion 835*c* of overmolded material.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A vehicle beam assembly comprising:
   a main beam having a front side, a top side, a rear side, and a bottom side, wherein at least one side includes a cutout;
   a main beam support comprising a first end that includes a planar surface, a middle portion, a second end, a first side surface, a top surface having a plurality of holes, a second side surface, and a bottom surface; and
   an overmolded joint comprising at least two gussets, at least two reinforcement ribs, a load bearing wall, at least one supporting rib, at least one lateral rib, at least one spanning rib, and at least one bottom rib,
   wherein the first end and the planar surface of the main beam support contact the main beam,
   wherein the main beam and the main beam support are connected by the overmolded joint in such a manner that the load bearing wall is disposed in at least a portion of the cutout of the main beam, and
   wherein the at least two gussets of the overmolded joint include a first gusset extending from the first side surface of the main beam support to the main beam and a second gusset extending from the second side surface of the main beam support to the main beam, and wherein the at least two reinforcement ribs include a first reinforcement rib that extends around the main beam support and through a first hole of the main beam support and connects to the load bearing wall, and a second reinforcement rib that extends around the main beam support and through a second hole of the main beam support.

2. The vehicle beam assembly of claim 1, wherein the cutout is formed in the front side and the top side of the main beam.

3. The vehicle beam assembly of claim 1, wherein the cutout is formed in the main beam in at least a portion of the front side and at least a portion of the top side.

4. The vehicle beam assembly of claim 1, wherein the main beam includes more than one cutout.

5. The vehicle beam assembly of claim 1, wherein the main beam and the main beam support each further include fastening holes, wherein the fastening holes in the main beam align with the fastening holes in the main beam support, wherein the fastening holes in the main beam support are on the planar surface of the first end, and wherein the main beam and the main beam support are further connected by at least one of the following: riveting and bolting.

6. The vehicle beam assembly of claim 1, wherein the main beam and the main beam support are further connected by welding.

7. The vehicle beam assembly of claim 1, wherein the load bearing wall extends at least between the first side surface and the second side surface of the main beam support.

8. The vehicle beam assembly of claim 1, wherein the overmolded joint is constructed of at least one of the following materials: glass filled polypropylene, polymeric materials, polypropylene, polyethylene, and ethylene propylene diene monomer (EPDM) rubber.

9. The vehicle beam assembly of claim 1, wherein the overmolded joint further comprises a plurality of lateral ribs and a plurality of spanning ribs that form a reinforcing lattice on at least a portion of the bottom side of the main beam and on at least a portion of the bottom surface of the main beam support.

10. A vehicle beam assembly comprising:
    a main beam having a front side, a top side, a rear side, and a bottom side; a main beam support having a first end that includes a planar surface, a middle portion, a second end, a first side surface, a top surface having at least one hole, a second side surface, and a bottom surface; and
    an overmolded joint having at least two gussets, at least two reinforcement ribs, at least two load bearing walls that abut the main beam, at least one supporting rib, at least one lateral rib, at least one spanning rib, and at least one bottom rib,
    wherein the first end and the planar surface of the main beam support contact the main beam,
    wherein the main beam and the main beam support are connected by the overmolded joint, and wherein the at least two gussets of the overmolded joint include a first gusset extending from the first side surface of the main beam support to the main beam and a second gusset extending from the second side surface of the main beam support to the main beam, and wherein the at least two reinforcement ribs include a first reinforcement rib that extends around the main beam support and through a first hole of the main beam support to connect to the load bearing wall, and a second reinforcement rib that extends around the main beam support and through the second hole of the main beam support.

11. The vehicle beam assembly of claim 10, wherein the at least two load bearing walls further include a first load bearing wall and a second load bearing wall that abut opposing sides of the front side of the main beam.

12. The vehicle beam assembly of claim 10, wherein the main beam and the main beam support are further connected by welding.

13. The vehicle beam assembly of claim 10, wherein the at least two load bearing walls are located on the bottom side of the main beam and the bottom surface of the main beam support, and the at least two load bearing walls extend between the first side surface and the second side surface, extend away from the top surface of the main beam support, and extend away from the top side of the main beam.

14. The vehicle beam assembly of claim 10, wherein the overmolded joint is constructed of at least one of the following materials: glass filled polypropylene, polymeric materials, polypropylene, polyethylene, and ethylene propylene diene monomer (EPDM) rubber.

15. The vehicle beam assembly of claim 10, wherein the overmolded joint further comprises at least two lateral ribs and at least three spanning ribs that form a reinforcing lattice on at least a portion of the bottom side of the main beam and on at least a portion of the bottom surface of the main beam support.

16. A vehicle beam assembly comprising:
at least one beam having a plurality of sides and at least one cutout on at least one side;
at least one beam support; and
an overmolded joint having a top portion, a bottom portion, and a load bearing wall,
wherein the beam contacts the beam support, and wherein the beam and the beam support are connected by the overmolded joint such that the load bearing wall is disposed in a space defined by the cutout to span the cutout along the at least one side and to extend in a direction that is continuous with the at least one side;
wherein the overmolded joint comprises a reinforcement rib that extends around the beam support; and
wherein the at least one beam support defines a hole, and the reinforcement rib extends through the hole to connect to the load bearing wall.

17. The vehicle beam assembly of claim 16, wherein the beam support contacts a top side of the at least one beam, and the load bearing wall is disposed on a bottom side of the at least one beam.

18. The vehicle beam assembly of claim 16, wherein the overmolded joint includes a first gusset overlapping the beam support and extending to the beam, and a second gusset overlapping the beam support and extending to the beam.

* * * * *